(12) United States Patent
Schulte et al.

(10) Patent No.: US 7,109,686 B2
(45) Date of Patent: Sep. 19, 2006

(54) SYSTEM AND METHOD FOR PRECHARGING AND DISCHARGING A HIGH POWER ULTRACAPACITOR PACK

(75) Inventors: Juergen J. Schulte, San Diego, CA (US); Swen O. Ruppert, Moehrendorg (DE); Eugen Holl, Langenzenn (DE)

(73) Assignee: ISE Corporation, Poway, CA (US)

( * ) Notice: Subject to any disclaimer, the term of this patent is extended or adjusted under 35 U.S.C. 154(b) by 0 days.

(21) Appl. No.: 11/167,525

(22) Filed: Jun. 27, 2005

(65) Prior Publication Data

US 2006/0103358 A1 May 18, 2006

Related U.S. Application Data

(60) Provisional application No. 60/628,030, filed on Nov. 15, 2004.

(51) Int. Cl.
*H02J 7/00* (2006.01)
*H02P 3/14* (2006.01)
*H02P 3/18* (2006.01)
*H02P 3/24* (2006.01)

(52) U.S. Cl. .................. 320/167; 320/166; 307/109; 318/376; 318/375; 318/377; 318/362

(58) Field of Classification Search ............... 320/166, 320/167; 307/109, 110; 318/376, 375
See application file for complete search history.

(56) References Cited

U.S. PATENT DOCUMENTS 5,914,542 A * 6/1999 Weimer et al. ............. 307/125
6,317,343 B1 * 11/2001 Okamura et al. ............. 363/59
6,615,118 B1 * 9/2003 Kumar ........................ 701/19
6,714,391 B1 3/2004 Wilk et al.
6,737,847 B1 * 5/2004 Watanabe et al. ........... 323/288
6,777,909 B1 * 8/2004 Aberle et al. ............... 320/104
6,844,704 B1 1/2005 Wilk et al.
2002/0195821 A1 * 12/2002 Wacknov ..................... 290/12
2004/0080165 A1 * 4/2004 Geis et al. .................... 290/52
2005/0041370 A1 * 2/2005 Wilk et al. .................. 361/502

* cited by examiner

*Primary Examiner*—Karl Easthom
*Assistant Examiner*—Alexis Boateng
(74) *Attorney, Agent, or Firm*—Stephen C. Beuerle; Procopio Cory Hargreaves & Savitch LLP

(57) ABSTRACT

This invention is a system and a method that uses the braking resistor, commonly used and available in electrically or hybrid-electrically propelled vehicles, to limit the precharge current during the startup of a high power ultracapacitor pack energy storage device and/or safely and rapidly discharge an ultracapacitor pack for maintenance work or storage to lengthen the life of the individual ultracapacitor cells and, correspondingly, the whole pack. The use of the braking resistor for precharging an ultracapacitor energy storage pack is an effective and less expensive method compared to other methods such as a separate DC-to-DC converter. This method includes the control logic sequence to activate and deactivate switching devices that perform the connections for the charging and discharging current paths.

37 Claims, 15 Drawing Sheets

SYSTEM AND METHOD FOR PRECHARGING AND DISCHARGING A HIGH POWER ULTRACAPACITOR PACK

CROSS-REFERENCE TO RELATED APPLICATIONS

This application claims the benefit of U.S. Provisional Application 60/628,030 filed Nov. 15, 2004 under 35 U.S.C. 119(e).

FIELD OF THE INVENTION

The field of the invention relates to systems and methods for the startup initial charging and the shutdown discharging of a high-voltage, high-power ultracapacitor energy storage pack composed of a large number of serially connected individual low-voltage ultracapacitor cells that store an electrical charge.

BACKGROUND OF THE INVENTION

The use of ultracapacitor packs for high-voltage, high-power energy storage applications is well known (See, for example, U.S. Pat. Nos. 6,844,704 and 6,714,391). However, the high current, low resistance characteristics of ultracapacitors present a problem during the startup (charging) phase for a completely discharged pack and the shutdown (discharging) phase of a charged pack.

Due to the low resistance of the ultracapacitors, it is usually not possible to connect the pack to a high voltage source by simply closing a high power contactor relay switch. If this is done, the initial connection of an ultracapacitor pack to a charging circuit looks like a direct short to the charging circuit and the resulting high current inrush into the ultracapacitor pack from the charging circuit can easily damage the charging circuit. One method of initially charging a completely discharged pack uses a high-power DC/DC converter so that voltage is increased slowly to limit the current flow in the circuit. Two problems with using the high-power DC/DC converter is that this component is very expensive, adding significant cost to the overall system, and is an additional component, adding complexity to the system. Furthermore, if the DC/DC converter remains in the circuit during normal operation to minimize the high voltage drop as the ultracapacitor pack discharges, the energy storage and supply cycle experiences the reduced efficiency of the two way energy path through the DC/DC converter.

At the end of an operation period, typically at the end of the day, it is desirable to discharge the ultracapacitor pack for safety, cell equalization, and increased cell life. Reducing the stand-by voltage across each cell is a means to increase the cell and pack lifetime. A passive balancing network consisting of a resistor in parallel with each cell may discharge an ultracapacitor pack but it typically requires hours for the voltage to drop to a minimum level. An active circuit to balance and/or discharge each cell may also drop the pack voltage, but it adds more cost and complexity to the ultracapacitor pack.

SUMMARY OF THE INVENTION

The present invention involves a method for precharging and/or discharging an ultracapacitor pack where a braking resistor, a common component used to dissipate power from an electro-magnetic braking regeneration system in hybrid electric vehicles, is connected in series with the ultracapacitor pack during startup to limit the precharge current into the ultracapacitor pack, eliminating the need for a very expensive, high-power DC/DC converter. Similarly, during shutdown the braking resistor is connected across the pack to safely and rapidly discharge the pack to a minimum stand-by level. This is an effective, low-cost and safe method of precharging and/or discharging an ultracapacitor pack. The invention also utilizes other components commonly used on hybrid-electric vehicles: an engine/generator, an inverter, and various high power switching relays called contactors.

In a typical hybrid-electric vehicle application an ultracapacitor pack is charged from either the engine/generator, or the traction motor operating in the braking regeneration mode.

The generator can supply all the power necessary to quickly charge the ultracapacitor pack, but the generator is always producing some minimum voltage much higher than zero (e.g. 200 volts) due to its permanent magnet design and because it is connected to an engine, which is running at some minimum speed (idle). In general, the voltage is too high to allow a direct connection to the ultracapacitors.

An ultracapacitor pack is excellent for storing the high power braking regeneration energy where the traction motor operates as a generator to apply a drag on the driveline and decelerate the vehicle. Braking regeneration also reduces wear and maintenance on the mechanical braking system. However, when there is no energy storage or the energy storage is charged to capacity the electromagnetic braking regeneration system dissipates power through a braking resistor and/or by using the generator as a motor to spin the engine with the fuel supply cut off. A typical braking resistor for a heavy-duty vehicle is liquid cooled and has a 60 kW power rating. One or more of these resistors may be used on a heavy-duty vehicle.

Spinning a non-fueled engine dissipates power as it converts the spinning energy into heat by working against the compression of the engine pistons and cylinders and transfers energy to the accessories through the belt and/or gear power-take-offs on the engine. A typical heavy duty engine that is spun by a generator can absorb 30 kW of power. Spinning the engine in this way may also use the engine water pump to continue circulating cooling fluid through the braking resistor.

The inventors have recognized that when a hybrid-electric vehicle has both components, an ultracapacitor pack for energy storage and a braking resistor for excess power dissipation, the braking resistor can be connected in series with the ultracapacitor pack during startup to limit the precharge current into the ultracapacitor pack and/or connected across the ultracapacitor pack during shutdown to safely and rapidly discharge the ultracapacitor pack to a standby level. Contactors or high current IGBT (Insulated Gate Bipolar Transistor) solid state switches are used to implement the connections.

The braking resistor limits the in-rush current, and the high power rating of the braking resistor allows for rapid initial precharging of the ultracapacitor pack without overloading the charging circuit. Another consideration is that if the uncharged ultracapacitor pack were connected directly to the generator during engine start up, the engine starter does not have enough torque to turn the engine against the torque of a generator that sees a shorted DC output bus.

Once the engine/generator has started with the braking resistor connected in series and the ultracapacitor pack precharging has begun, this method may also include some voltage regulation of the generator output. For example, as an option to quicken the precharge process, the generator output voltage can be increased to compensate for the voltage drop across the resistor. When the ultracapacitor pack is sufficiently charged to match the generator output voltage the braking resistor is switched out of the circuit and the generator is connected via the generator control inverter directly to the ultracapacitor pack.

During the normal operation of the generator and ultracapacitor pack energy storage no further precharging is required for voltage matching. When the ultracapacitor pack is charged the engine may be turned off for short time periods while the ultracapacitor pack supplies all the power demands from the high voltage bus. As the ultracapacitor pack reaches a minimum level of energy storage, the pack supplies the power to the generator to spin the engine for a restart without using the low voltage engine starter. Upon restarting the engine the generator again supplies power to the high voltage bus for the vehicle power requirements and to recharge the ultracapacitor pack to a minimum operating level. The precharge process is not repeated again until the vehicle starts up from a discharged energy storage pack.

An ultracapacitor pack may have an active or passive voltage balancing circuit for the individual capacitors and the pack may be designed to self-discharge overnight. A precharge process is required any time the pack voltage drops below the minimum generator voltage.

In another aspect of the invention, the ultracap pack is precharged through braking regeneration (i.e., the ultracap pack is precharged through the braking resistors using the energy from the drive/traction motors when they act like generators in the process of doing electric braking). In this case braking regeneration energy is used instead of energy from the engine/generator. This variation has the same switch connections to the high voltage DC bus as the embodiment(s) described above, but the source energy is from the drive/traction motors. In this embodiment the switching is performed through Siemens DUO-Inverter switches shown and described herein. Different embodiments may use other inverters and switches. This embodiment may be advantageous, for example, if the engine would not start with the starter, but the hybrid-electric vehicle could be set rolling (e.g., downhill), then the braking regeneration could store enough energy in the ultracap packs to get the engine started from the generator as is normally done during operation after startup.

In a further aspect of the invention, the ultracap pack is immediately discharged through the braking resistor for service and maintenance safety, and as an end-of-the-day turn-off for quicker equalization in the ultracap pack without having to depend on the much slower leak-down discharging current across the passive parallel resistors within the ultracap pack. The immediate discharge may be accomplished through Siemens DUO-Inverter switches shown and described herein. Different embodiments may use other inverters and switches.

In another aspect of the invention the inverter IGBT switches are set to discharge the ultracap pack through the generator by spinning the engine with the fuel cut off. Thus, the ultracapacitor pack may be discharged down to the minimum operating voltage of the generator. In this way the generator can be used in place of or in addition to the braking resistor to rapidly discharge the ultracapacitor pack. There may be an advantage in using the two methods together because the spinning engine will continue to pump engine coolant through the cooling circuit that typically includes the liquid cooled braking resistor.

BRIEF DESCRIPTION OF THE DRAWINGS

The accompanying drawings, which are incorporated in and form a part of this specification, illustrate embodiments of the invention and together with the description, serve to explain the principles of this invention.

DETAILED DESCRIPTION OF A PREFERRED EMBODIMENT

Figure 1:
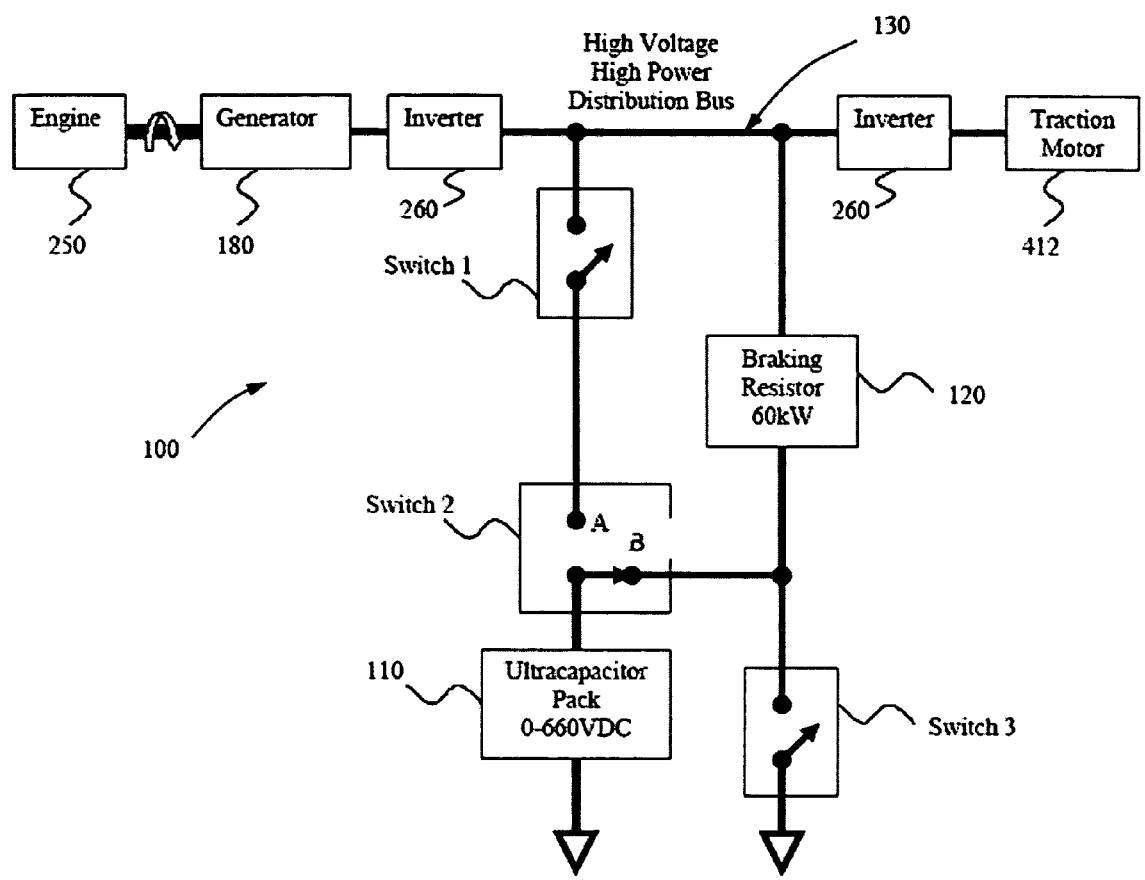
FIG. 1 is a block diagram depicting an embodiment of a hybrid-electric vehicle drive system precharging an ultracapacitor energy storage pack through a high-power braking resistor.

With reference to FIG. 1, the block diagram depicts an embodiment of a hybrid-electric drive system 100 with an ultracapacitor pack 110 for energy storage and a braking resistor 120 for extra deceleration power dissipation. For normal operation switch 1 is closed and switch 2 is in the A position, connecting the ultracapacitor pack 110 to the power bus 130, and switch 3 is closed whenever it is desired to use the braking resistor 120. With switch 1 open, switch 3 open, and switch 2 in the B position the braking resistor 120 is connected in series with the ultracapacitor pack 110. Thus, the ultracapacitor pack 110 can be charged from the power bus 130 through the braking resistor 120. Switch 2 and the connection to the braking resistor 120 are the only additions to the hybrid-electric drive connection for allowing the hybrid-electric drive connection to be used for precharging the ultracapacitor pack 110 through the high-power braking resistor 120. This saves the expense of a separate precharge circuit by using the already present braking resistor 120 that has the power handling capacity to limit the initial charging current to the ultracap pack 110.

At the conclusion of the precharge function switch 2 is switched to the A position for normal operation. Because the precharge function happens typically only once a day, mechanical high power contactors could be used to implement the function of switch 2. However, the preferred embodiment as described below shows how the Insulated Gate Bipolar Transistors (IGBT's) of an inverter/controller are used to implement all the switching functions.

Figure 2A:
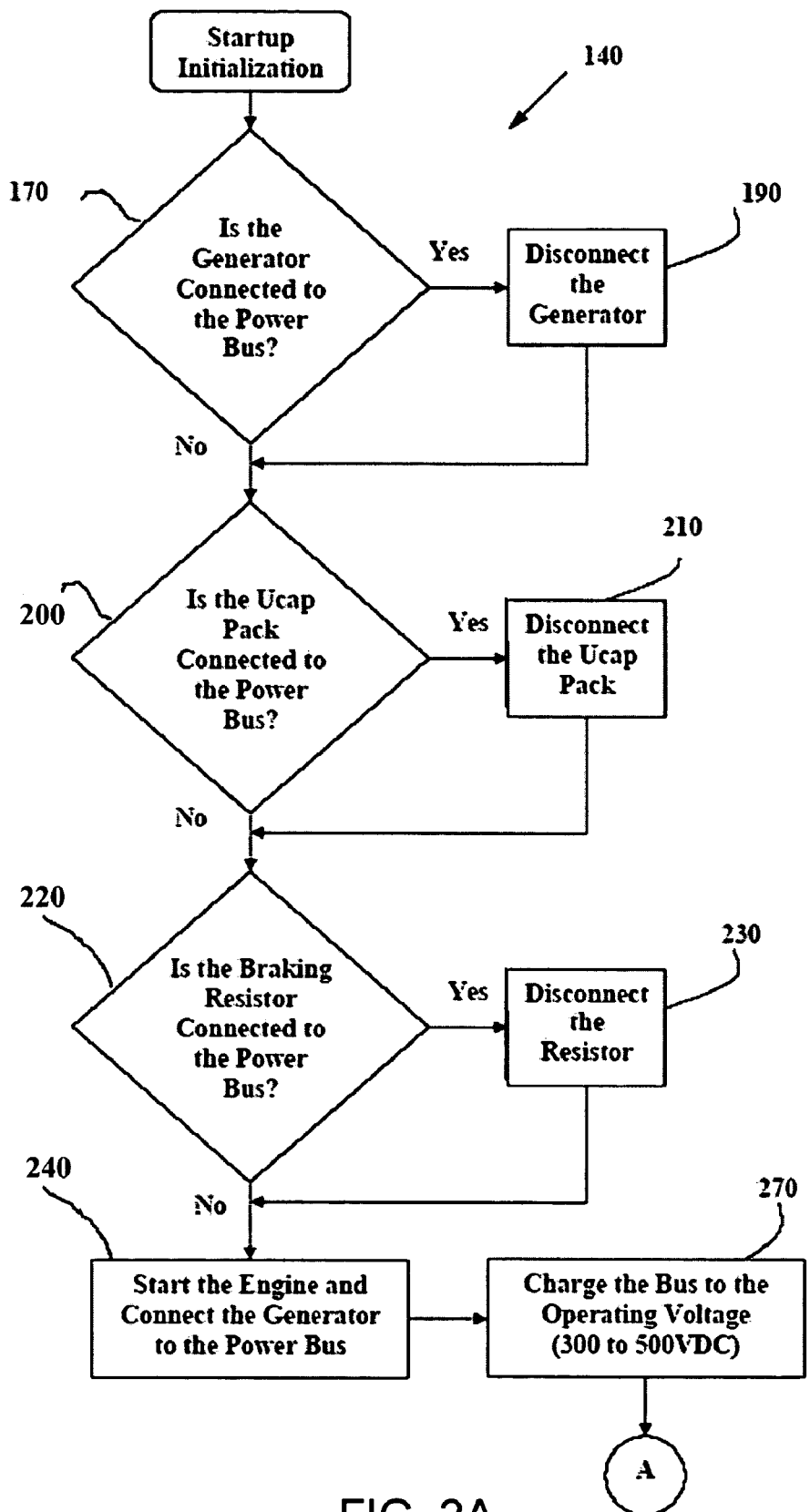
FIGS. 2A–2E are a logic flow diagram of an exemplary control sequence for the hybrid-electric vehicle drive system illustrated in FIG. 1 that incorporates the braking resistor to precharge an ultracapacitor pack. The control sequence includes four functions or processes: 1) Start Up Initialization and Ultracapacitor Precharging (FIG. 2A, 2B), 2) Run Modes: Acceleration (FIG. 2C) and 3) Deceleration (FIG. 2D), and 4) Safety Shutdown Discharge (FIG. 2E).
Figure 2B:
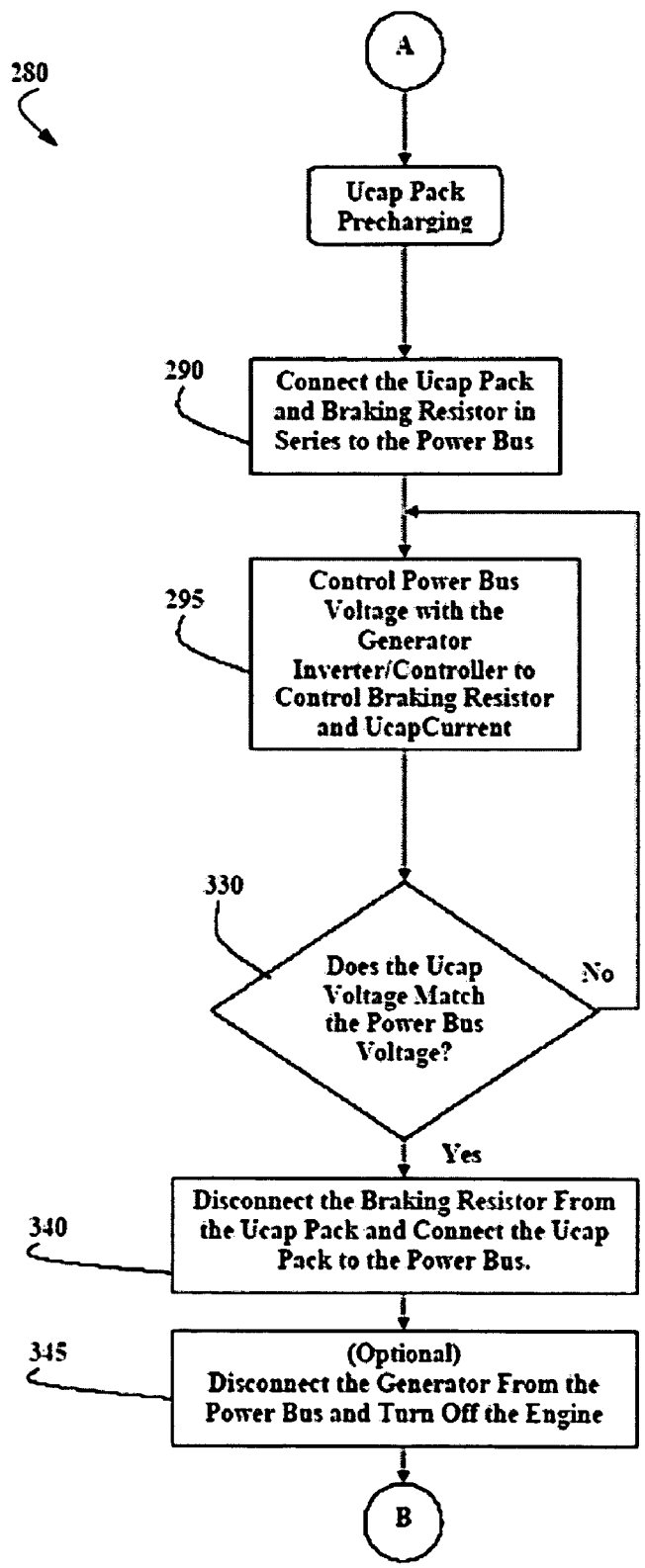
Figure 2C:
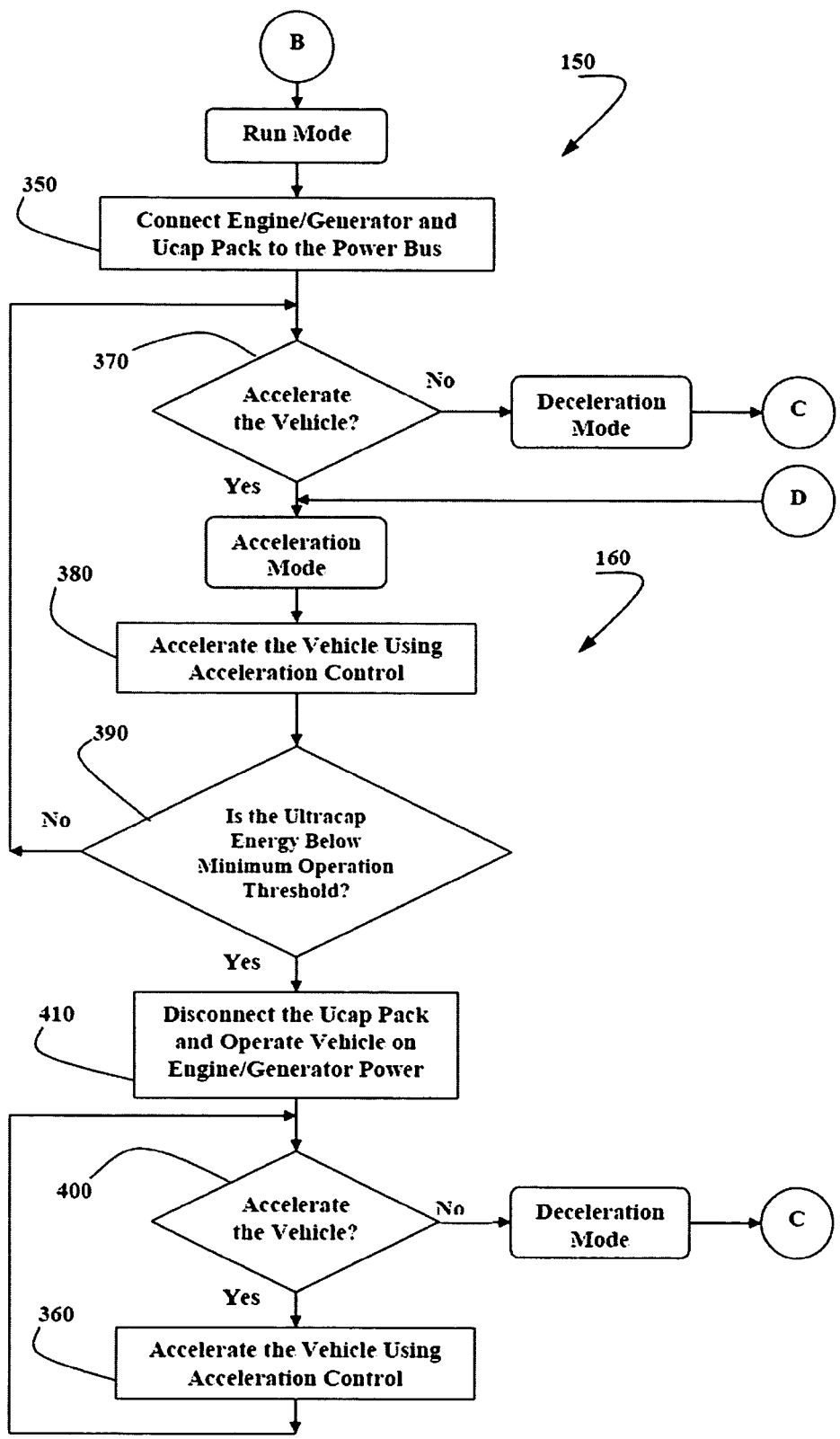
Figure 2D:
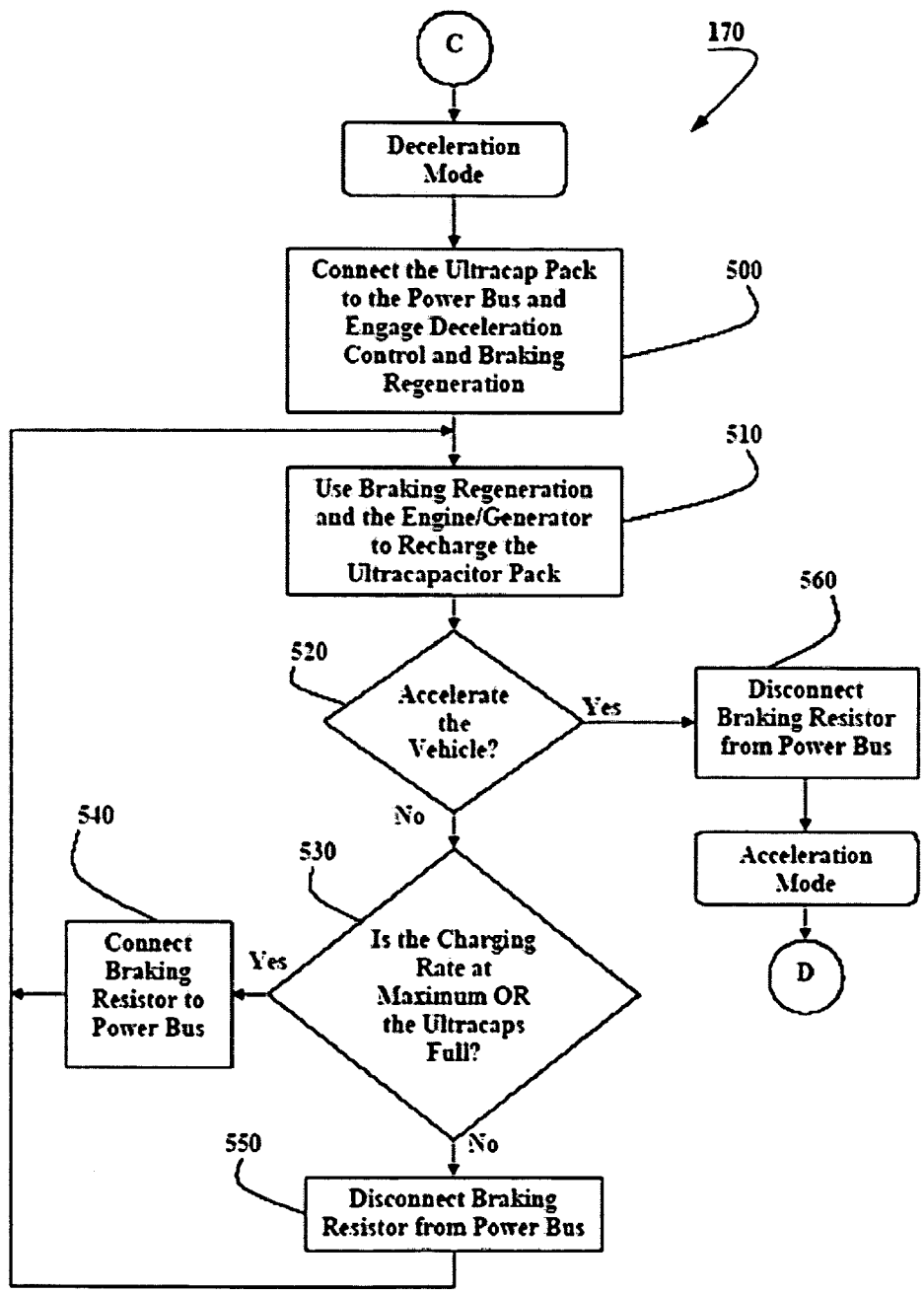
Figure 2E:
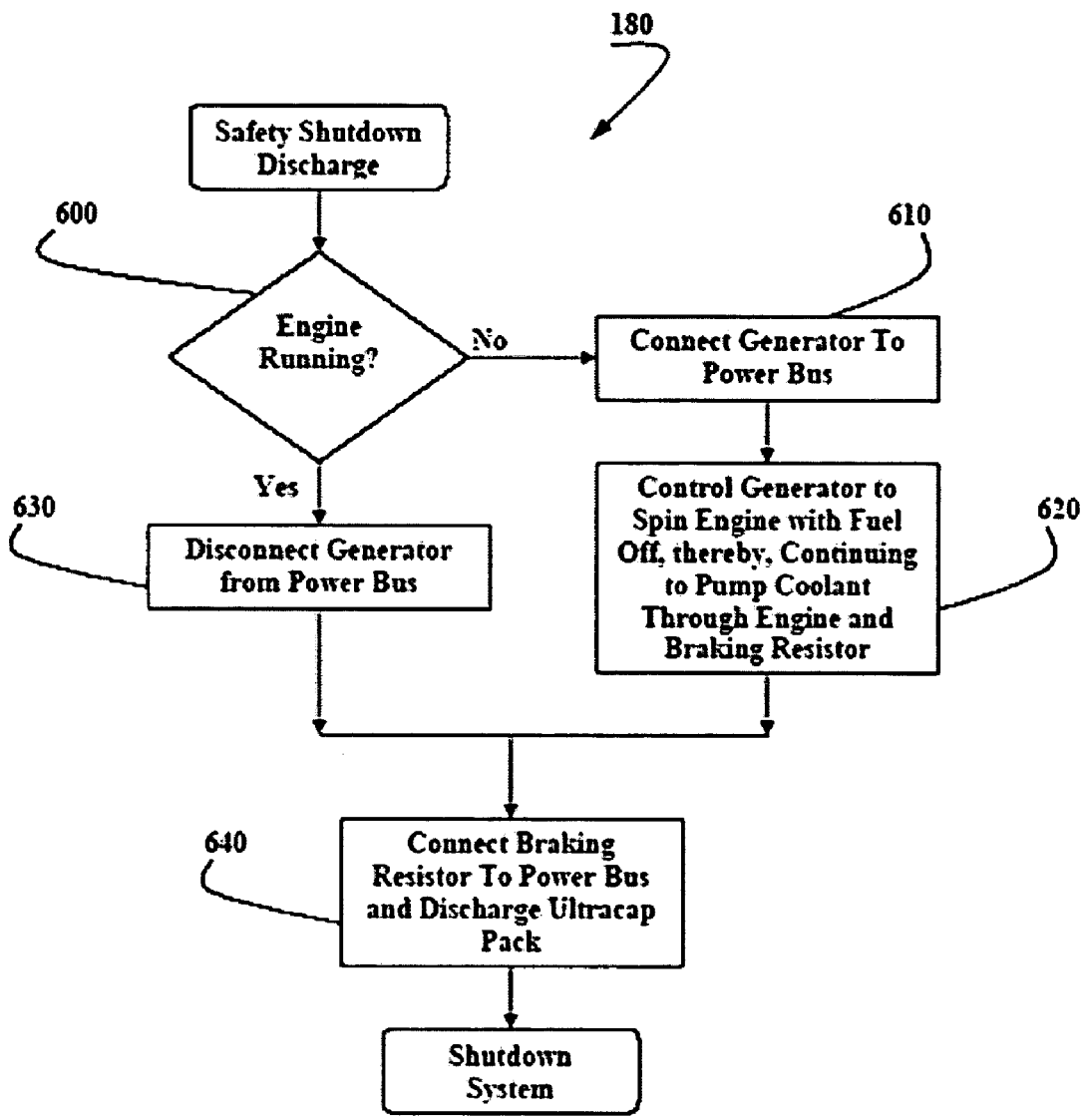

With reference to FIGS. 2A–2E, the exemplary control logic flow of hybrid-electric drive system 100 that incorporates this invention consists of four functions or processes: 1) Start Up Initialization 140 and Ultracapacitor Precharging 280 (FIG. 2A, 2B), 2) Run Modes 150: Acceleration 160 (FIG. 2C) and 3) Deceleration 170 (FIG. 2D), and 4) Safety Shutdown Discharge 180 (FIG. 2E). For the purposes of this description braking and/or deceleration occurs any time that there is no acceleration and can be activated by releasing the accelerator pedal and/or applying the brake pedal.

With reference to FIG. 2A, at Start Up 140, the system 100 is initialized by checking for the correct setting of all the switches. At step 170, a determination is made as to whether generator 180 is connected to the power bus 130. If yes, control is passed on to step 190, where the generator 180 is disconnected and then control is passed on to step 200. If no, control is passed on to step 200. At step 200, a determination is made as to whether the ultracap pack 110 is connected to the power bus 130. If yes, control is passed on to step 210, where the ultracap pack 110 is disconnected and then control is passed on to step 220. If no, control is passed on to step 220. At step 220, a determination is made as to whether the braking resistor 120 is connected to the power bus 130. If yes, control is passed on to step 230, where the braking resistor 120 is disconnected and then control is passed on to step 240. If no, control is passed on to step 240. At step 240, engine 250 starts via a standard 12 or 24VDC starter and provides the kinetic power to turn the generator 180, and the generator 180 is connected to the power bus 130. At step 270, the generator control inverter 260 charges the high power bus 130 up to an operating voltage level, e.g., 300 to 500VDC.

With reference to FIG. 2B, to begin precharge 280, at step 290, the braking resistor 120 is connected in series with the ultracapacitor pack 110 and connected to the high power bus 130. Next, at step 295, the generator control inverter 260 controls the voltage of the high power bus 130 to control the charging current passing through the braking resistor 120 to the ultracap pack 110. Thus, the charging current is adjusted for a safe fast charge time. At step 330, a determination is made as to whether the ultracap 110 voltage matches the voltage of the high power bus 130. If no, the control is passed back to step 295 to continue controlling the charging current by adjusting the generator 180 output voltage. If yes, control is passed on to step 340, where the braking resistor 120 is safely disconnected from the ultracap pack 110, the ultracap pack 110 is connected to the high power bus 130.

At the optional step 345 the generator 180 is disconnected from the power bus 130 and the engine 250 is turned off.

Otherwise, with reference to FIG. 2C, after precharge 180, the vehicle control continues into a normal running mode 150 at step 350 where the generator 180 and the ultracapacitor pack 110 are both connected to the power bus 130. As first determined at step 370 the control system will be in either an acceleration mode 160 (FIG. 2C) or deceleration mode 170 (FIG. 2D) for the rest of the day until the vehicle is turned off and the ultracap pack 110 is discharged.

The flow chart for the acceleration mode 160 illustrated in FIG. 2C will be described after generally describing the acceleration mode 160. During acceleration 160 the vehicle accelerates on energy storage power from ultracap 110 and power from engine/generator 250/180 until the ultracap 110 stored energy level drops below a minimum threshold, where the ultracap 110 is disconnected from the power bus and the engine/generator 250/180 power alone accelerates the vehicle until the control switches to the deceleration mode 170.

With reference to the flow chart illustrated in FIG. 2C, at step 370, a determination is made as to whether the vehicle is acceleration. If no, control passes on to the deceleration mode 170 (FIG. 2D). If yes, the vehicle is in acceleration mode 160 and control is passed on to step 380, where the vehicle control accelerates the vehicle using both energy storage power from the ultracap 110 and power from the engine/generator 250/180. At step 390, a determination is made as to whether the ultracap 110 energy level is below a minimum threshold (as determined by a minimum voltage o the power bus 130). If no, control is passed back to step 370, where a determination is made as to whether the vehicle control is still in acceleration mode 160. If no, control passes on to the deceleration mode 170 (FIG. 2D). If yes and acceleration is still desired, control passes on to step 380 and again passes control to step 390. At step 390, if the power bus voltage is below the minimum indication for the ultracap 110 storage level, control passes on to step 410, where the ultracap pack 110 is disconnected from the power bus 130 and the vehicle continues to accelerate on power from engine/generator 250/180. At step 400, a determination is made as to whether acceleration is still desired. If no, control is passed on to deceleration mode 170. If yes, vehicle control continues to accelerate the vehicle at step 360 and control passes back to step 400 where again a determination is made as to whether acceleration is still desired. If no, control is passed on to deceleration mode 170 at step 500 (FIG. 2D).

The flow chart for the deceleration mode 170 illustrated in FIG. 2D will be described after generally describing the deceleration mode 170. Once deceleration control is sensed the system inverter/controllers 260 switch the traction motors 412 into a regeneration mode and match the voltage of the power bus 130 to the voltage of the ultracapacitor pack 110 to connect the ultracapacitor pack 110 if it is not already connected. The ultracapacitor pack 110 immediately starts receiving the regeneration charge. The charge current into the ultracap pack is monitored for a maximum current threshold, e.g. 300 Amps. When the inverter controller 260 can no longer maintain the maximum current limit, or the ultracap pack 110 energy storage is filled to capacity, the control switching connects the braking resistors 120 to the power bus to dissipate energy that cannot be stored. In practice, the engine/generator controller 260, can also absorb some energy by using the generator 180 to spin the engine 250 with the fuel supply turned off. When more braking is needed beyond the regeneration capacity of the drive system, the mechanical brakes are also applied to decelerate the vehicle.

With reference to the flow chart illustrated in FIG. 2D, upon deceleration, at step 500, as the deceleration control and braking regeneration are engaged, if the ultracap pack 110 is not already connected, the voltage of the power bus 130 is matched to the voltage of the ultracap pack 110, and the ultracap pack 110 is connected to the power bus 130. At step 510, control passes to an algorithm that makes a determination on how to best charge the ultracap pack 110 from both the braking regeneration motors 412 and the engine/generator 250/180 to have a full energy storage by the time the vehicle stops to be ready for the next start up acceleration. At step 520, a determination is made as to whether to continue in the deceleration mode 170 or switch to the acceleration mode 160. If the vehicle control indicates going to the acceleration mode 160, control passes to step 560 where, if connected, the braking resistor 120 is disconnected from the power bus 130. If the control continues with the deceleration 170, control passes to step 530 where a determination is made if the ultracap pack 110 is at its maximum current threshold (e.g. 300 Amps) or if the ultracap pack 110 is charged to capacity. If yes, control is passed on to step 540, where, If not already connected, the braking resistor 120 is connected to the power bus 130 and control is passed back to step 510. If no, control is passed onto step 550, where, if connected, the braking resistor 120 is disconnected from the power bus 130.

With reference to the flow chart illustrated in FIG. 2E, an exemplary rapid safety shutdown discharge method 180 of the ultracap pack 110 will now be described. The safety discharge 180 assumes an embodiment where the engine coolant pump uses an engine power take off to circulate a cooling fluid through the engine 250 and the liquid cooled braking resistor 120. Other embodiments are possible that use different cooling loops and coolant pumps without deviating from the invention. At step 600, a determination is made if the engine 250 is running. If no, the control is passed onto step 610 to connect the generator 180 to the power bus 130 and pass the control to step 620 where the generator 180 spins the engine 250 with the fuel shut off to dissipate power. Power is dissipated and the coolant pump circulates coolant until the voltage of the power bus 130 drops below the minimum operating voltage of the generator 180. If the determination at step 600 is yes, the engine 250 is running, control is passed to step 630 where the generator 180 is disconnected from the power bus 130. Both steps 620 and 630 pass control to step 640 where the braking resistor 120 is connected to the power bus 130 and the discharge current from the ultracap pack 110 passes through the braking resistor 120. Thus, the ultracap pack 110 is discharged typically in less than a minute, compared to hours that are required to discharge the ultracap pack 110 passively. Without departing from the spirit of this invention, other embodiments may use only the braking resistor 120 or only the engine/generator 250/180 or other combinations of the braking resistor 120 and the engine/generator 250/180 to perform a rapid discharge of the ultracap pack 110.

Figure 3:
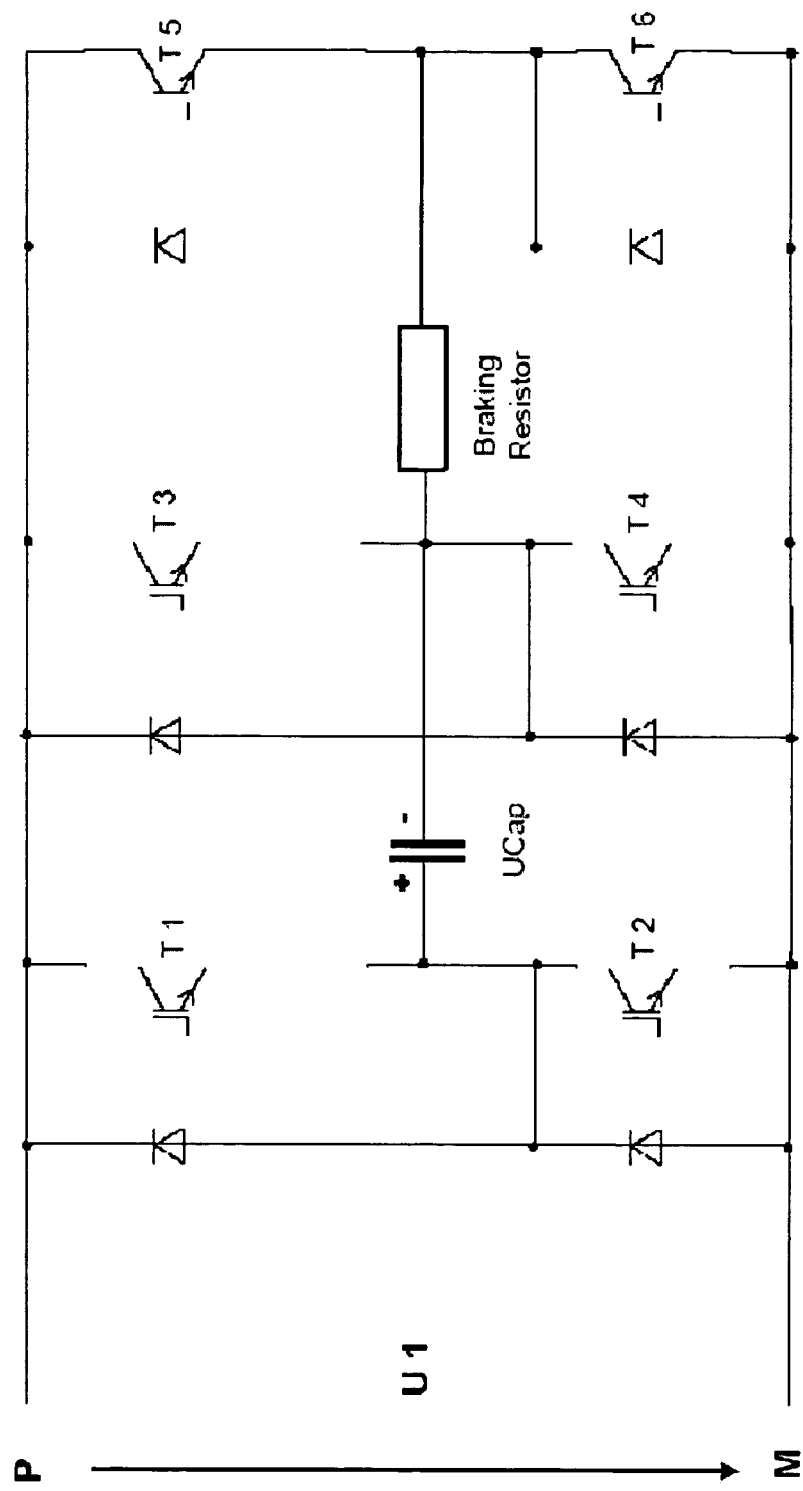
FIG. 3 is a circuit schematic diagram that shows an embodiment of the invention that uses IGBT switching in a standard 3-phase inverter power stage.

FIG. 3 is a circuit schematic diagram that shows an embodiment of the invention that uses IGBT switching in a standard 3-phase inverter power stage.

With reference to FIG. 3, an embodiment of the invention is shown where the hybrid-electric drive system uses a standard 3-phase IGBT power inverter stage. T2 and T3 are always off. During precharge, T1 and T6 are on and T4 and T5 are off. During acceleration discharging T1, T4, T5, and T6 are off. During braking regeneration and generator charging of the ultracaps T1 and T4 are on, and T5 and T6 are off. During additional brake resistor power dissipation during braking T4 and T5 are on, and T1 and T6 are off. T5 is the only one turned on to discharge the ultracap pack through the braking resistor during a rapid safety discharge.

Figure 4:
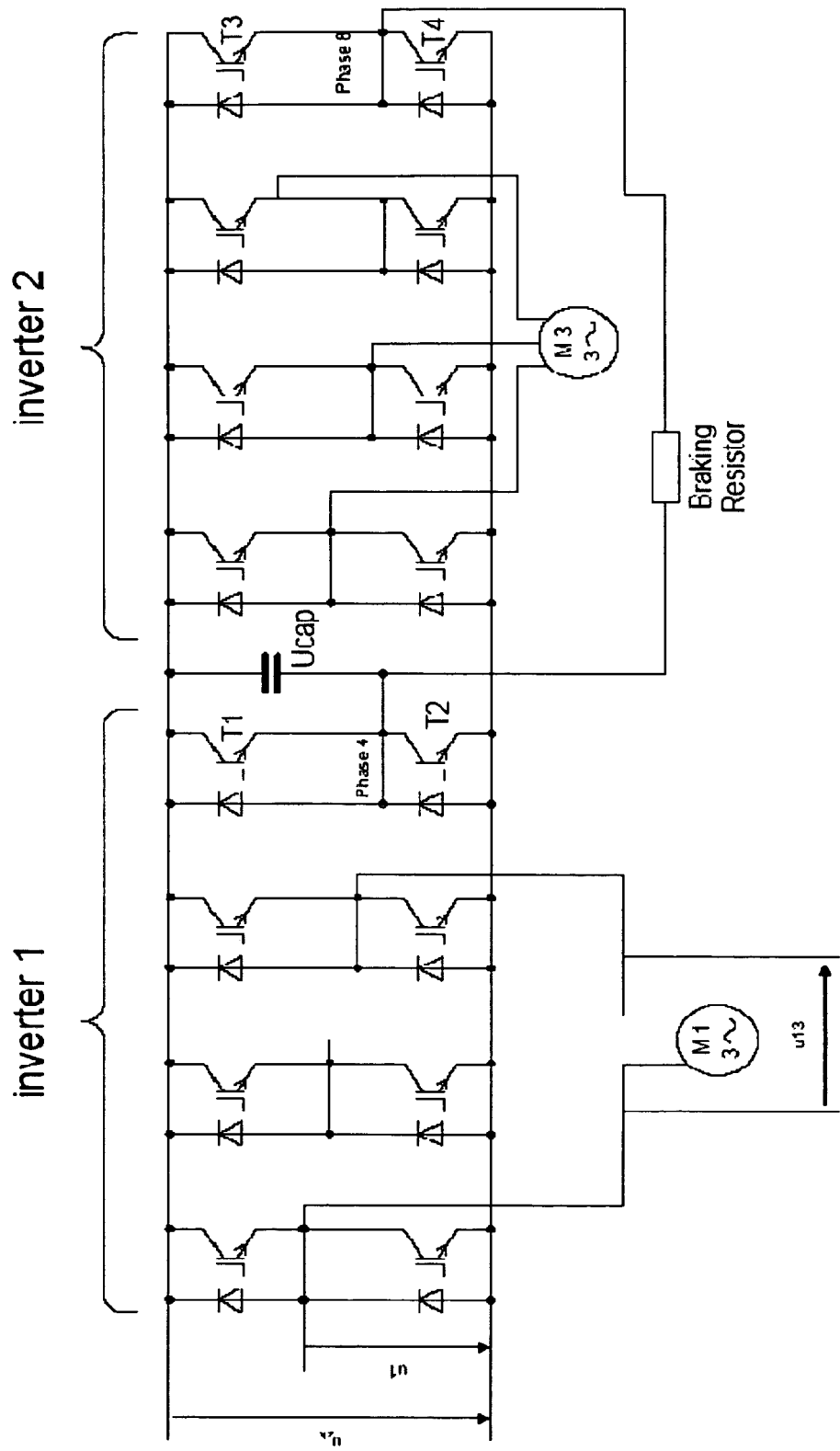
FIG. 4 is a circuit schematic diagram that shows an embodiment of the invention that uses IGBT switching in a standard 8-phase Siemens Duo-inverter where six phases control two 3-phase motors and the two remaining phases perform the switching for the braking resistor and ultracapacitor pack.

With reference to FIG. 4, another embodiment uses the two extra IGBT switching phases of a standard 8-phase inverter that uses 6 phases to control two motors. T1 is always off. T2 is on during charging of the ultracap pack from the generator or the regenerative braking and during additional brake resistor power dissipation during braking. T3 is on to connect the braking resistor during braking or for discharging the ultracap pack. T4 is on during precharge and otherwise off.

With reference to FIG. 5, four other embodiments are shown that use different methods of connecting two phases of an inverter. These embodiments demonstrate the choices available within the invention to decouple the ultracap pack. FIG. 5A and FIG. 5C show the positive side of the ultracap pack connected to the plus side of the inverter and the switching is performed on the minus side, while FIG. 5B and FIG. 5D show the minus side of the ultracap pack connected to the minus side of the inverter and the switching is performed on the plus side.

FIGS. 6, 7, and 8 are circuit schematic diagrams that show embodiments of the invention that use the IGBT switching in four inverter phases. Because two Siemens Duo-Inverters are typically used in the ISE/Siemens ELFA based hybrid-electric drive systems, the embodiments shown in FIGS. 6, 7, and 8 offer more choices in a practical system for decoupling and isolation of components for safety and redundancy.

Figure 6A:
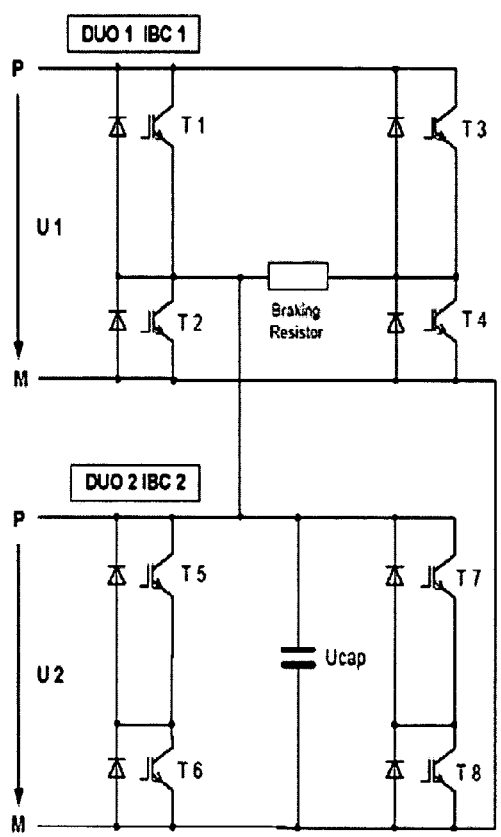
FIG. 6 has two different circuit schematic diagrams; 6A, and 6B; that show two alternative embodiments of the invention using IGBT switching with four phases of any inverter.

With reference to FIG. 6, the two embodiments shown use two phases in each of a pair of inverters for the purpose of decoupling the two inverters. FIG. 6A shows the minus sides of both inverters connected together, but the plus sides of the inverters are isolated. FIG. 6A is similar to FIGS. 5B and 5D where the minus side of the ultracap pack is connected to the minus sides of the inverters, and the switching of the ultracap pack and the braking resistor occurs between the plus side of inverter 1 and the plus side of inverter 2.

Figure 5A:
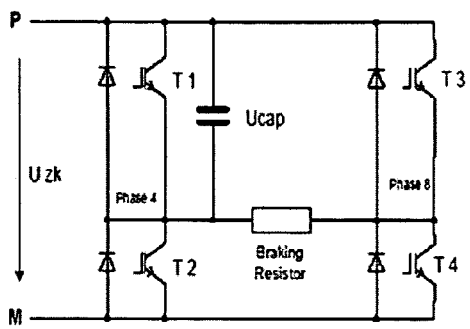
FIG. 5 has four different circuit schematic diagrams; 5A, 5B, 5C, and 5D; that show four alternative embodiments of the invention using IGBT switching with two phases of any inverter.
Figure 5B:
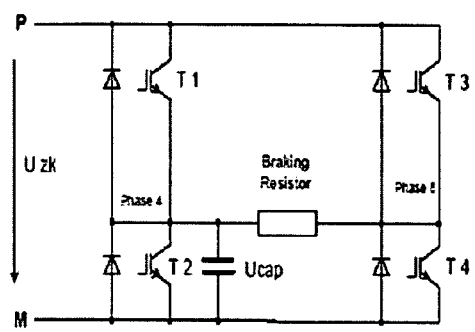
Figure 5C:
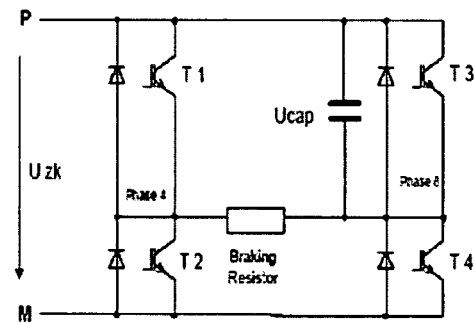
Figure 5D:
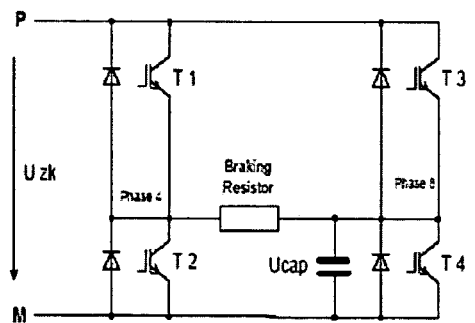
Figure 6B:
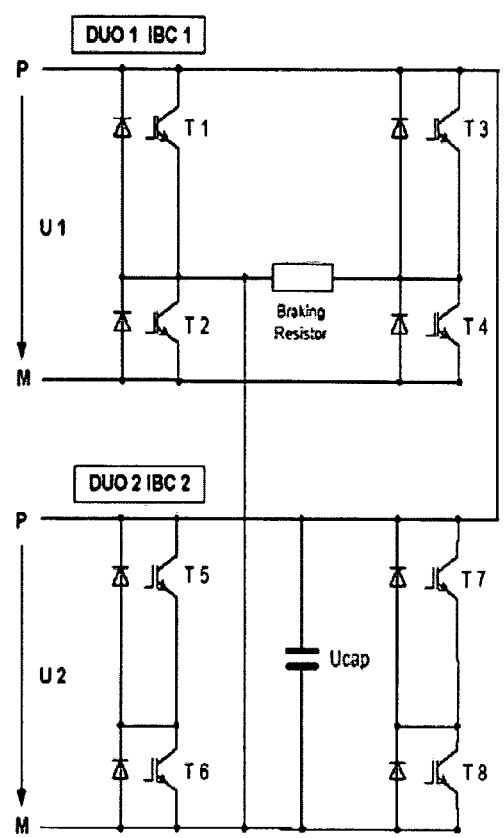

FIG. 6B shows the plus sides of both inverters connected together, but the minus sides of the inverters are isolated. FIG. 6B is similar to FIGS. 5A and 5C where the plus side of the ultracap pack is connected to the plus sides of both inverters and the switching of the ultracap pack and the braking resistor occurs between the minus side of inverter 1 and the minus side of inverter 2.

Figure 7A:
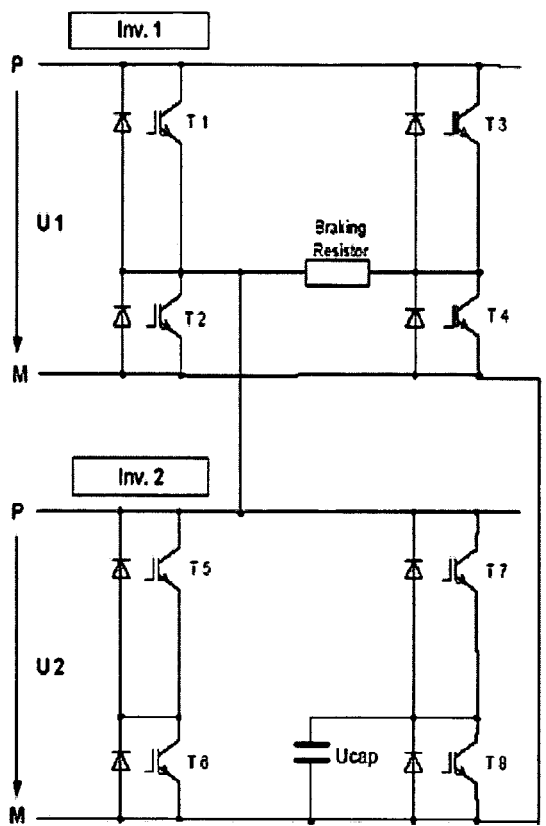
FIG. 7 has two different circuit schematic diagrams; 7A, and 7B; that show two more alternative embodiments of the invention using IGBT with four phases of any inverter.
Figure 7B:
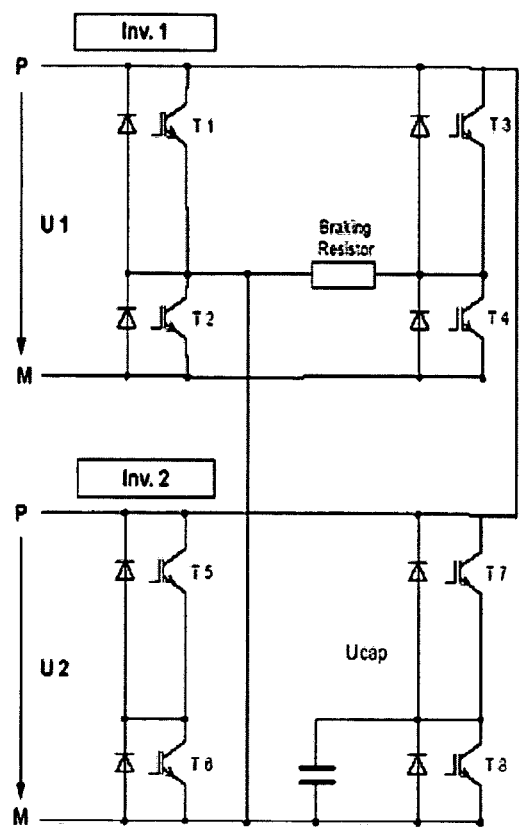
Figure 8A:
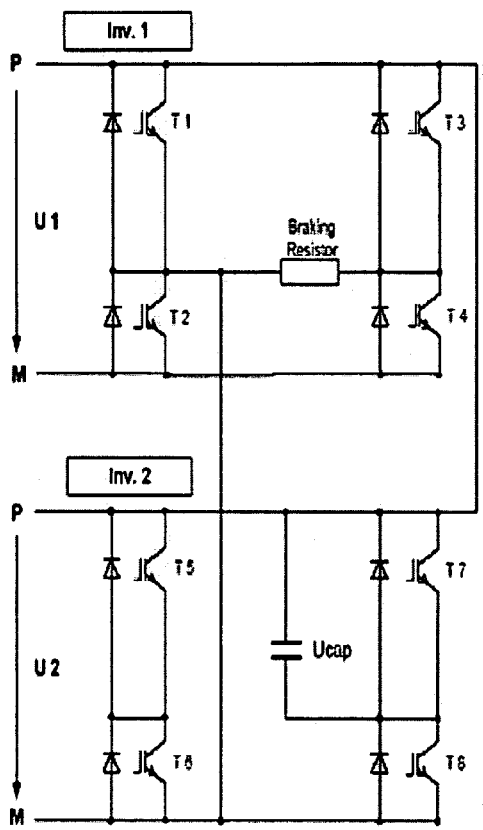
FIG. 8 has two different circuit schematic diagrams; 8A, and 8B; that show two more alternative embodiments of the invention using IGBT switching with four phases of any inverter. A preferred embodiment is shown in the schematic diagram of FIG. 8A that uses the remaining two phases in each of two single 8-phase Siemens Duo-Inverters
Figure 9:
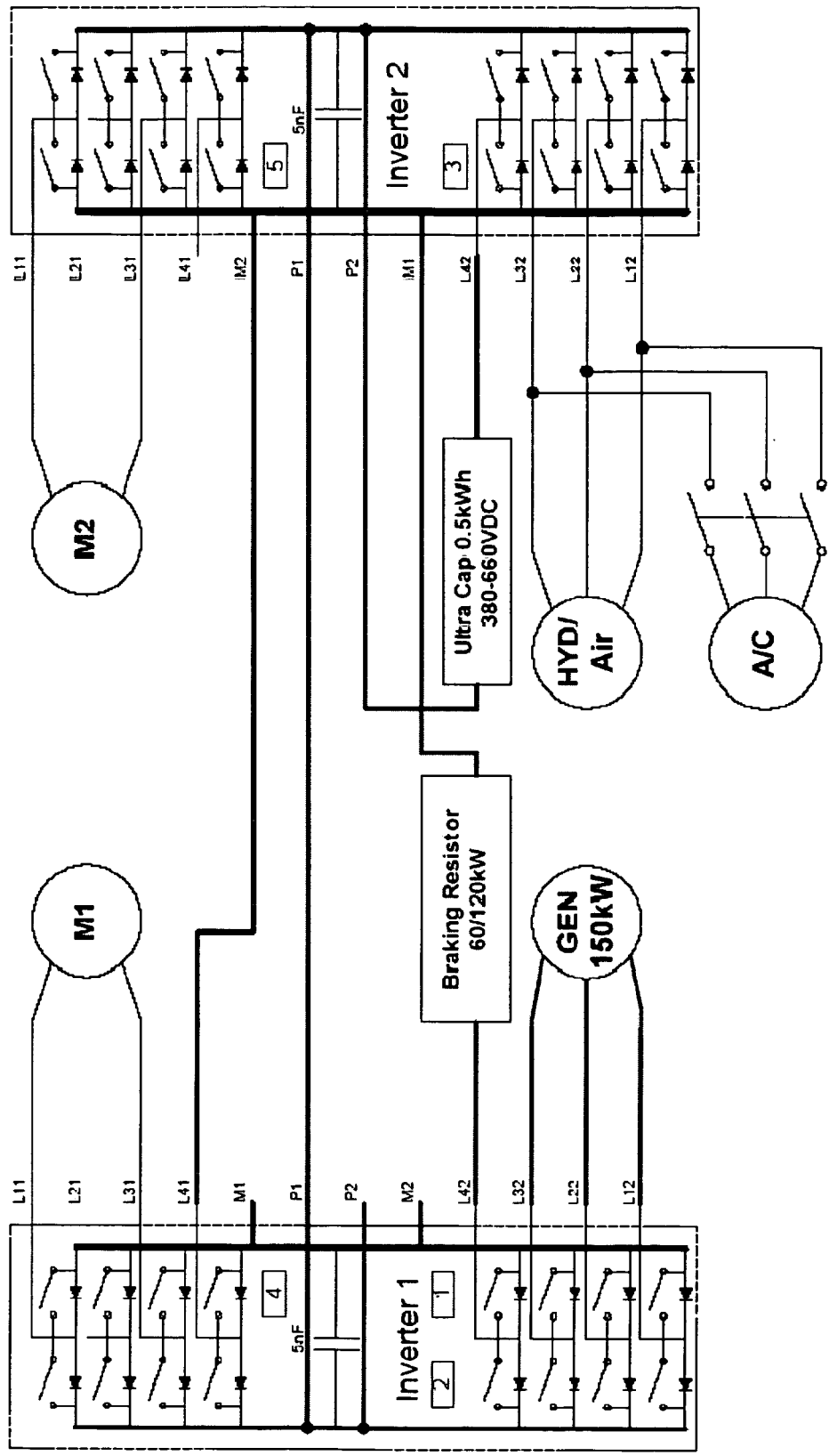
FIG. 9 is an electrical circuit schematic diagram that depicts the preferred embodiment of FIG. 8A as configured in a hybrid-electric vehicle drive system with two Siemens Duo-Inverters that also control a generator, two drive motors, and AC auxiliary power for the vehicle's electric accessories consisting of the hydraulic pump, air compressor, and air conditioning compressor.

The embodiments shown in FIGS. 3, 4, 5, 6, 7B, and 8A all have the braking resistor connected to one side of the ultracap pack, but in the embodiments shown in FIGS. 7A, 8A, and 9 the braking resistor is decoupled from the ultracap pack and only connected through a switch.

With reference to FIG. 7, the two embodiments shown use the extra two phases of a pair of inverters to accomplish a different decoupling of two inverters with the ultracap pack. FIG. 7A is similar to FIGS. 5B, 5D, and 6A where the plus sides of the inverters are isolated, but the minus sides of both inverters are connected together and connect to the minus side of the ultracap pack. The switching of the ultracap pack occurs between the plus side of the ultracap pack and the plus side of inverter 2. The braking resistor is connected to the plus side of inverter 2 and is switched to the minus side of both inverters.

FIG. 7B is similar to FIGS. 5A, 5C, and 6B where the minus sides of the inverters are isolated, but the plus sides of both inverters are connected together. The minus side of the ultracapacitor is connected to the braking resistor and the minus side of inverter 2. From the minus side of inverter 2 the ultracap pack and the braking resistor, respectively, are switched to the plus side of inverter 2 and the plus side of inverter 1.

With reference to FIG. 8, the two embodiments shown use the two extra phases of a pair of inverters to obtain a different decoupling of two inverters along with the ultracap pack.

FIG. 8A is similar to FIGS. 5A, 5C, 6B, and 7B where the minus sides of the inverters are isolated, but the plus sides of both inverters are connected together and connect to the plus side of the ultracap pack. The braking resistor connects to the minus side of inverter 2 and is isolated from the ultracap pack. The ultracap pack switching occurs between the minus side of the ultracap pack and the minus side of inverter 2. The braking resistor switching occurs between the braking resistor and the plus sides of both inverters.

Figure 8B:
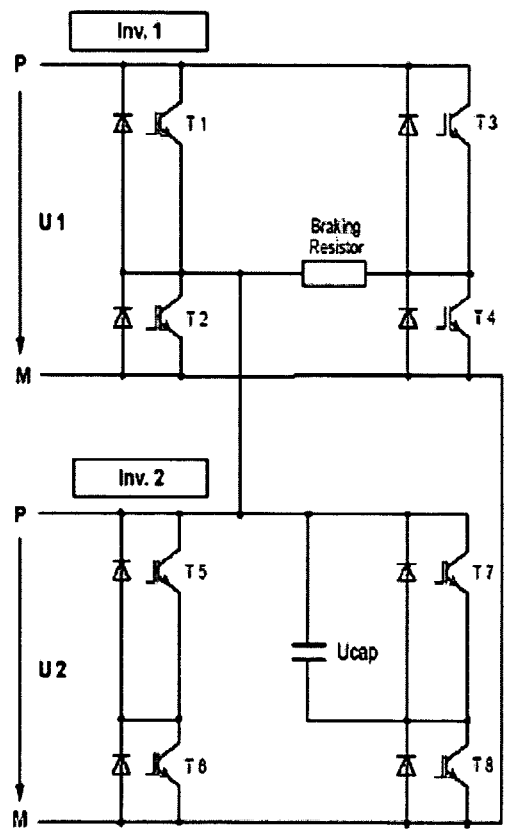

FIG. 8B is similar to FIGS. 5B, 5D, 6A, and 7A where the plus sides of the inverters are isolated, but the plus sides of both inverters are connected together. The plus side of the ultracapacitor is connected to the braking resistor and the plus side of inverter 2. From the plus side of inverter 2 the ultracap pack and the braking resistor, respectively, are switched to the minus side of inverter 2 and the minus side of inverter 1.

With reference to FIG. 9, the circuit schematic shows the preferred embodiment of FIG. 8A imbedded into the connections of a hybrid-electric drive vehicle that incorporates two traction motors, a generator, an ultracapacitor pack, a braking resistor, a 3-phase AC electric accessories motor for the hydraulic pump and air compressor, and a 3-phase AC air conditioning heat exchanger compressor. The 150 kW generator and the traction motor M1 use three phases each of the eight phases available in inverter 1. Traction motor M2 and the AC power require six phases of the eight phases of inverter 2. The three of the remaining four phases, two in inverter 1 and one in inverter 2, implement the switching for the ultracap pack and the braking resistor. During start up, the engine starts via a 24V starter. Inverter 1 bus is charged to 500VD. IGBT's 1 and 3 close to initiate capacitor precharge. After the voltages have equalized, IGBT 1 opens and IGBT 4 connects the ultracap. During acceleration, the vehicle accelerates on energy storage power until the voltage reaches 500V, where the engine kicks in until the voltage is back up to 650VDC. If the voltage drops below 320VDC, the capacitors disconnect via IGBT 3 and the vehicle operates on engine power at 700VDC. During braking, the system controller reduces the voltage to 320VDC and IGBT 3 closes. Braking starts immediately at a current of no more than 400 A. When the voltage approaches 700VDC, the braking resistors are turned on via IGBT 2 to limit the voltage to 700VDC.

In another aspect of the invention, the ultracap pack 110 is precharged through braking regeneration (i.e., the ultracap pack 110 is precharged through the braking resistors 120 using the energy from the drive/traction motors 412 when they act like generators in the process of doing electric braking). In this case braking regeneration energy is used instead of energy from the engine/generator 250/180. This variation does not have the same switch connections to the high voltage DC bus as the FIG. 9 embodiment(s) described above because each drive motor is on a different inverter, but for connections with both drive motors on the same inverter, the source energy is from the drive/traction motors 412. The switching is performed through inverter switches shown and described herein. This embodiment may be advantageous, for example, if the engine 250 would not start with the starter, but the hybrid-electric vehicle could be set rolling (e.g., downhill), then the braking regeneration could store enough energy in the ultracap packs 110 to get the engine 250 started from the generator 250 as is normally done during operation after startup.

In a further aspect of the invention, the ultracap pack 110 is immediately discharged through the braking resistor 120 for service and maintenance safety, and as an end-of-the-day turn-off for quicker equalization in the ultracap pack 110 without having to depend on the parallel resistors (for equalization) within the ultracap pack 110. The immediate discharge may be accomplished through the inverter switches shown and described herein. The braking resistor (s) 120, which are liquid cooled, release the discharged energy received from the ultracap pack 110 in the form of heat.

Figure 10A:
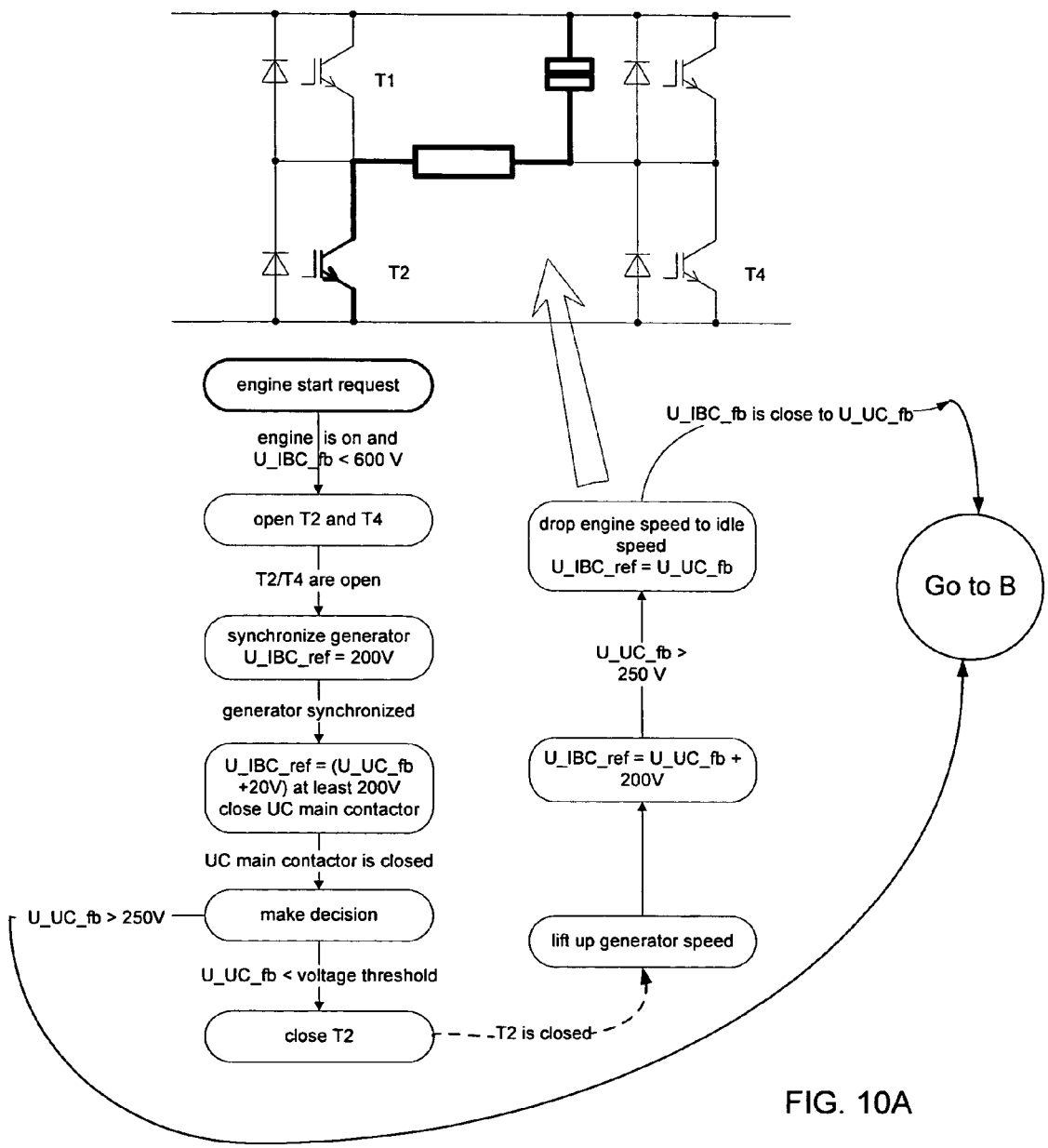
FIGS. 10A and 10B are a combined electrical circuit schematic and algorithm flow chart for an exemplary method of precharging/discharging an ultracapacitor energy storage pack through a high-power braking resistor.
Figure 10B:
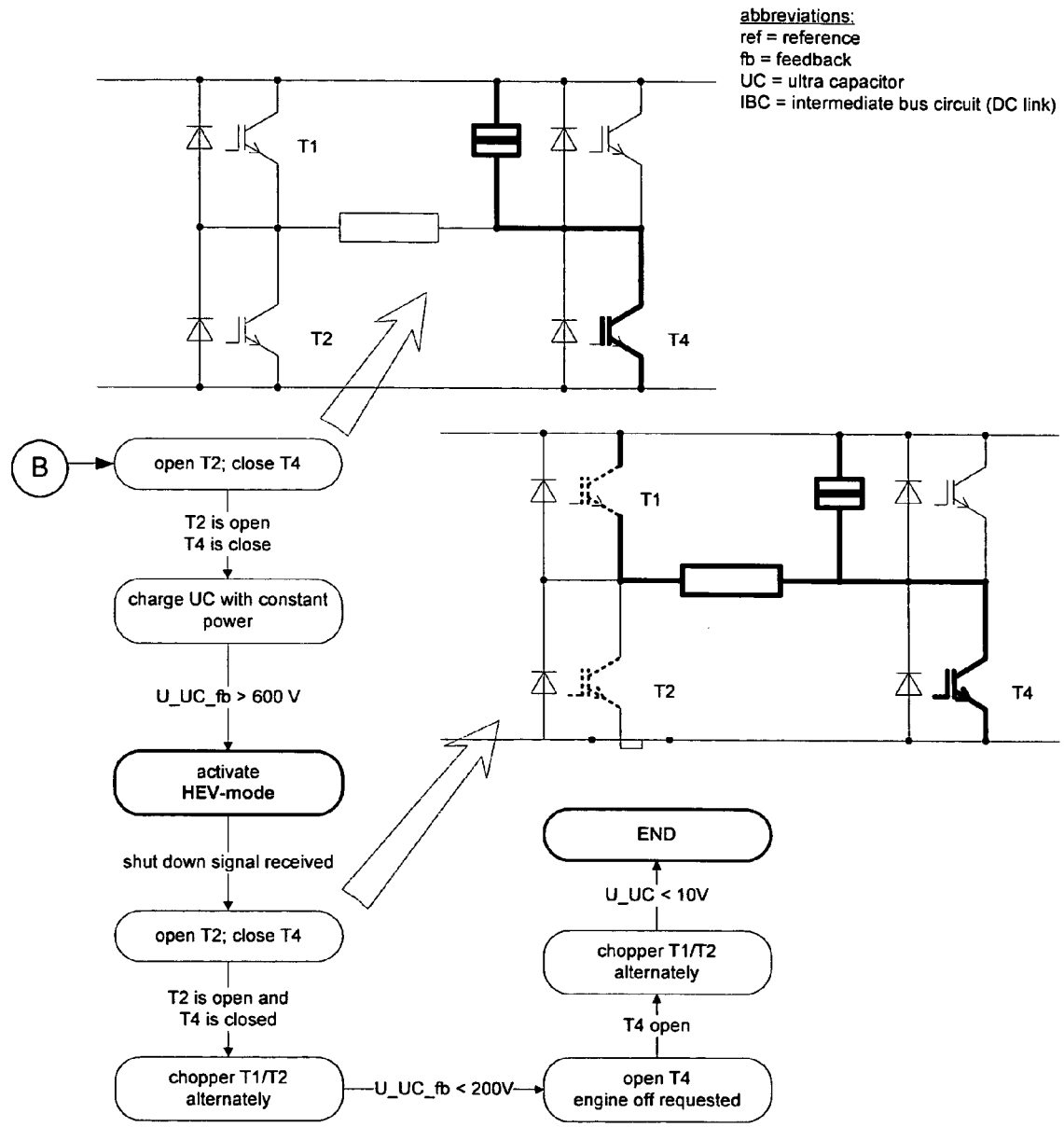

FIGS. 10A and 10B are a combined electrical circuit schematic and algorithm flow chart for an exemplary method of precharging/discharging an ultracapacitor energy storage pack through a high-power braking resistor.

It will be readily apparent to those skilled in the art that still further changes and modifications in the actual concepts described herein can readily be made without departing from the spirit and scope of the invention as defined by the following claims.

What is claimed to:

1. A system for precharging an ultracapacitor energy storage cell pack, comprising:
    an ultracapacitor pack, a high power DC bus, an electromagnetic braking regeneration system, and a breaking resistor to dissipate power from the electro-magnetic braking regeneration system;
    means for switching the braking resistor in series with the ultracapacitor pack;
    means for switching the braking resistor in series with the ultracapacitor, with the high power DC bus;
    means for determining when to disconnect the braking resistor in series with the ultracapacitor pack and connect the ultracapacitor pack directly with the high power DC bus;
    means for disconnecting the braking resistor in series with the ultracapacitor pack and connecting the ultracapacitor pack directly with the high power DC bus.

2. The system of claim 1, wherein the high power DC bus is powered from a power source including at least one of an engine/generator set, a fuel cell, a turbine generator set, a power grid, a propulsion motor in braking regeneration mode, and a battery pack.

3. The system of claim 1, wherein the system is a system of at least one of an electric vehicle and a hybrid-electric vehicle.

4. The system of claim 1, wherein the determining means includes means for identifying an ultracapacitor pack in a state of discharge.

5. The system of claim 1, wherein the determining means includes means for monitoring the ultacapacitor pack voltage.

6. The system of claim 1, wherein the determining means includes means for monitoring the power bus voltage.

7. The system of claim 1, wherein the determining means includes means for determining when an ultracapacitor pack voltage and a power bus voltage are matched.

8. The system of clam 1, further including a timing system to determine when an ultracapacitor pack precharge is complete.

9. The system of claim 1, wherein the switching means include at least one of high power contactor relays and Insulated Gate Bipolar Transistors (IGBTs).

10. The system of claim 1, wherein the switching means are liquid cooled.

11. The system of claim 1, further including means for increasing the voltage across the braking resistor, to control the charge current, after the braking resistor is connected in series with the ultracapacitor pack to shorten the precharge time.

12. The system of claim 2, wherein the power source, the braking resistor, and the ultracapacitor pack are liquid cooled.

13. The system of claim 2, wherein the power source is a generator, and the generator is a permanent magnet generator.

14. The system of claim 2, further including a power source input circuit with a power conditioning inverter, the power conditioning inverter being a DC to DC converter.

15. The system of claim 14, wherein the inverter is a Pulse Width Modulated (PWM) inverter.

16. The system of claim 14, wherein the inverter includes IGBT switching.

17. The system of claim 1, further including the traction motor control circuit with a power controlling inverter.

18. The system of claim 17, wherein the inverter is a PWM inverter.

19. The system of claim 17, wherein the inverter includes IGBT switching.

20. The system of claim 17, further including traction motors, and the traction motors are at least one of AC induction motors and permanent magnet motors.

21. The system of claim 1, wherein the ultracapacitor pack is a plurality of ultracapacitor packs connected in at least one of a series combination and a parallel combination.

22. The system of claim 1, wherein the braking resistor is a plurality of resistors connected in at least one of a series combination and a parallel combination.

23. The system of claim 1, wherein the braking resistor is a heating element for liquids.

24. The system of claim 1, wherein the ultracapacitor pack is any type of energy storage pack that requires a precharge function including a flywheel.

25. The system of claim 1, further including means for determining the current charge rate of the ultracapacitor pack.

26. The system of claim 25, wherein the determining means includes means for monitoring the voltage across the braking resistor.

27. A method of precharging an ultracapacitor energy storage cell pack, comprising:
providing a drive system including an ultracapacitor pack, a high power DC bus, an electro-magnetic braking regeneration system, and a breaking resistor to dissipate power from the electromagnetic braking regeneration system;
switching the braking resistor in series with the ultracapacitor pack;
switching the braking resistor in series with the ultracapacitor, with the high power DC bus;
determining when to disconnect the braking resistor in series with the ultracapacitor pack and connect the ultracapacitor pack directly with the high power DC bus;
disconnecting the braking resistor in series with the ultracapacitor pack and connecting the ultracapacitor pack directly with the high power DC bus.

28. The method of claim 27, further including determining the ultracapacitor pack is in a state of discharge.

29. The method of claim 27, further including monitoring the ultracapacitor pack voltage.

30. The method of claim 27, further including monitoring the power bus voltage.

31. The method of claim 27, further including determining when the ultracapacitor pack voltage is matched to the power bus voltage.

32. The method of claim 27, further including using a timer to determine when an ultracapacitor precharge is complete.

33. The method of claim 27, wherein the drive system includes at least one of software and firmware with control logic therein.

34. The method of claim 33, wherein the control logic is implanted by means of a Programmable Logic Controller (PLC).

35. The method of claim 27, further including reporting control commands and status reporting over a Control Area Network (CAN) data bus, the CAN data bus being a SAE Standard J1939.

36. The method of claim 35, wherein the control commands are part of the control strategy of a hybrid-electric vehicle drive system.

37. The method of claim 27, wherein the drive is a hybrid electric vehicle drive system.

* * * * *